United States Patent
Hong et al.

(10) Patent No.: US 11,159,782 B2
(45) Date of Patent: Oct. 26, 2021

(54) ELECTRONIC DEVICE AND GAZE TRACKING METHOD OF ELECTRONIC DEVICE

(71) Applicant: Samsung Electronics Co., Ltd., Gyeonggi-do (KR)

(72) Inventors: Sung-Min Hong, Gyeonggi-do (KR); Sung-Bin Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 16/314,466

(22) PCT Filed: Jul. 28, 2017

(86) PCT No.: PCT/KR2017/008197
§ 371 (c)(1),
(2) Date: Dec. 31, 2018

(87) PCT Pub. No.: WO2018/026145
PCT Pub. Date: Feb. 8, 2018

(65) Prior Publication Data
US 2019/0158819 A1    May 23, 2019

(30) Foreign Application Priority Data
Aug. 3, 2016    (KR) .................. 10-2016-0099159

(51) Int. Cl.
*H04N 13/383*    (2018.01)
*G06F 3/01*    (2006.01)
(Continued)

(52) U.S. Cl.
CPC ............. *H04N 13/383* (2018.05); *G06F 3/01* (2013.01); *G06F 3/013* (2013.01); *H04N 5/33* (2013.01); *H04N 13/344* (2018.05)

(58) Field of Classification Search
CPC ................................................... H04N 13/383
(Continued)

(56) References Cited

U.S. PATENT DOCUMENTS 10,268,268 B1 * 4/2019 Trail ..................... G06F 3/013
2011/0109528 A1    5/2011 Mun et al.
(Continued)

FOREIGN PATENT DOCUMENTS

KR    10-2013-0107981 A    10/2013
KR    10-2016-0017463 A    2/2016
(Continued)

*Primary Examiner* — Daniel T Tekle
(74) *Attorney, Agent, or Firm* — Cha & Reiter, LLC

(57) ABSTRACT

According to various examples of the present invention, an electronic device and a gaze tracking method of the electronic device: detect optical signals, which are outputted from a first light-emitting device and a second light-emitting device and reflected from a user's left eye and right eye, by means of a first camera and a second camera corresponding to each of the first light-emitting device and the second light-emitting device; and determine the user's gaze on the basis of the detected optical signals, wherein the first light-emitting device and the second light-emitting device can be positioned so as to correspond to a left-eye display region and a right-eye display region included in a display of the electronic device, respectively, and various other examples are also possible.

15 Claims, 11 Drawing Sheets

(51) Int. Cl.
*H04N 13/344* (2018.01)
*H04N 5/33* (2006.01)

(58) Field of Classification Search
USPC .......................................... 348/47
See application file for complete search history.

(56) References Cited

U.S. PATENT DOCUMENTS

| | | | |
|---|---|---|---|
| 2011/0211056 A1* | 9/2011 | Publicover | H04N 5/2354 |
| | | | 348/78 |
| 2014/0218281 A1* | 8/2014 | Amayeh | G06F 1/163 |
| | | | 345/156 |
| 2015/0220157 A1 | 8/2015 | Marggraff et al. | |
| 2016/0077585 A1* | 3/2016 | Mizuhara | G06F 3/04842 |
| | | | 345/157 |
| 2017/0205877 A1* | 7/2017 | Qin | G02B 27/0172 |

FOREIGN PATENT DOCUMENTS

| | | |
|---|---|---|
| KR | 10-2016-0022855 A | 3/2016 |
| WO | 2015/143073 A1 | 9/2015 |
| WO | 2016/014871 A1 | 1/2016 |

* cited by examiner

NORMAL MODE

HMT MODE

ELECTRONIC DEVICE AND GAZE TRACKING METHOD OF ELECTRONIC DEVICE

CROSS-REFERENCE TO RELATED APPLICATION(S)

This application is a U.S. National Stage application under 35 U. S. C. § 371 of an International application filed on Jul. 28, 2017 and assigned application number PCT/KR2017/008197, which claimed the benefit of a Korean patent application filed on Aug. 3, 2016 in the Korean Intellectual Property Office and assigned Serial number 10-2016-0099159, the entire disclosure of which is hereby incorporated by reference.

BACKGROUND

1. Field

Various embodiments relate to an electronic device and a method for tracking a gaze in an electronic device.

2. Description of the Related Art

As examples of methods of determining or tracking a user's gaze with an electronic device, methods of determining and tracking a gaze by using information, such as the glint of an iris, a pupil, or a cornea, are being studied.

In order to determine the position at which a user gazes at the screen of a display, for example, an optical signal is output through a light-emitting device (e.g., a light-emitting diode), and the position in an iris, a pupil, or a cornea, on which the optical signal is reflected, is analyzed, thereby determining the position at which the user gazes or the direction in which the user gazes.

SUMMARY

Since a light-emitting device is provided on the side of the electronic device, the direction of a user's pupil or the environment around the eyes (e.g., eyelids or eyelashes) may cause a difference between the tracked position or region at which the user gases at the electronic device and the position or region at which the user actually gazes.

Various embodiments can provide an electronic device that has a light-emitting device disposed on the back of a display of the electronic device, thereby performing a control such that an optical signal is outputted to the user's eyes through the display panel of the display, and can further provide a gaze tracking method thereof.

In addition, various embodiments can provide an electronic device that operates a light-emitting device so as to emit light according to the cycle of a screen frame output through the display, as well as a gaze tracking method thereof.

An electronic device according to various embodiments includes: a housing configured to have a first surface facing a first direction and a second surface facing a second direction opposite to the first direction; a display configured to be positioned between the first surface and the second surface; a first light-emitting device and a second light-emitting device configured to be positioned between the second surface and the left-eye display region and right-eye display region of the display, respectively; and a first infrared camera and second infrared camera configured to be positioned between the display and the second surface so as to correspond to the first light-emitting device and the second light-emitting device, respectively.

A gaze tracking method of an electronic device, according to various embodiments, includes: detecting optical signals output from a first light-emitting device and a second light-emitting device and reflected from the left eye and the right eye of a user using a first camera and a second camera corresponding to the first light-emitting device and the second light-emitting device, respectively; and determining a user's gaze on the basis of the detected optical signals, wherein the first light-emitting device and the second light-emitting device are configured to be positioned to correspond to the left-eye display region and right-eye display region included in the display of the electronic device.

According to various embodiments, in an electronic device and a gaze tracking method thereof since the light-emitting devices corresponding to the left eye and the right eye are configured to be positioned in a direction parallel to the center of the user's eyes, it is possible to determine a user's gaze without being affected by the environment around the user's eyes.

DETAILED DESCRIPTION

Figure 1A:
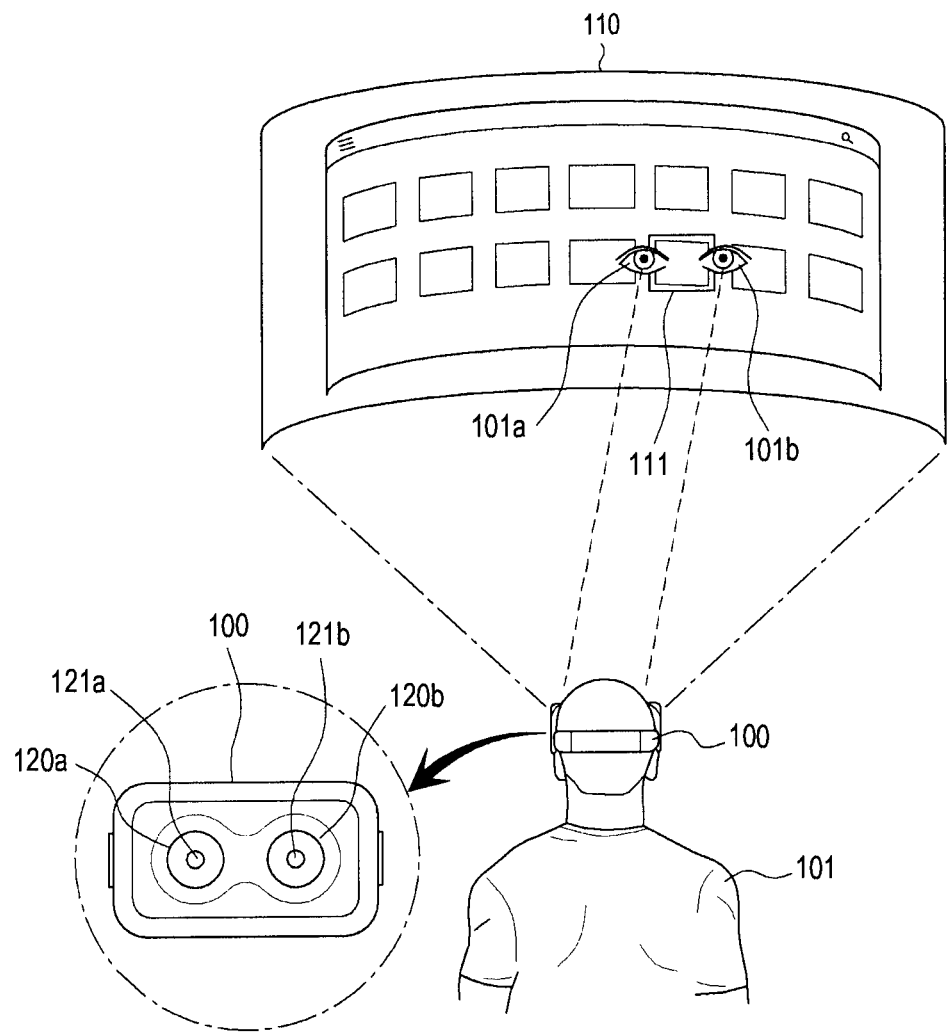
FIGS. 1A and 1B are diagrams illustrating various examples of the operation of a display in an electronic device according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of; for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may refer to a person using an electronic device or a device (for example, an artificial intelligence electronic device) using an electronic device.

Figure 1B:
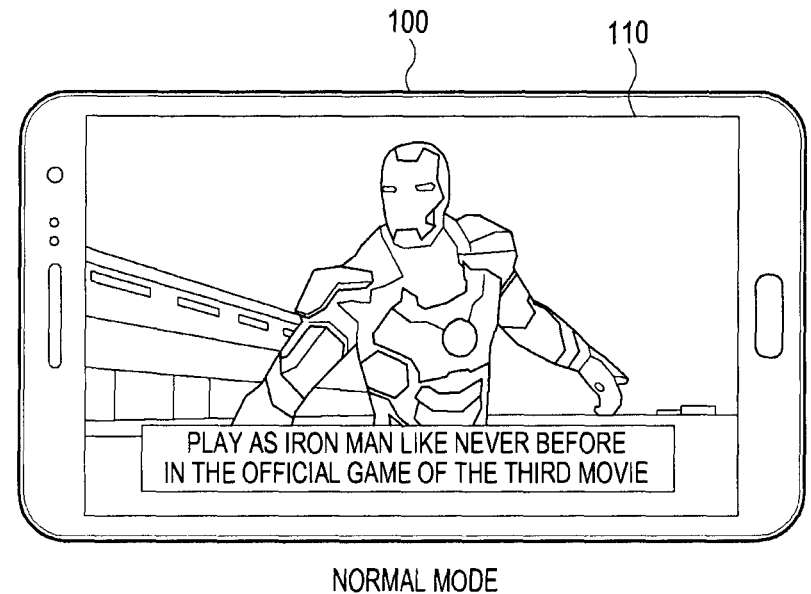
Figure 1B:
Figure 1B:
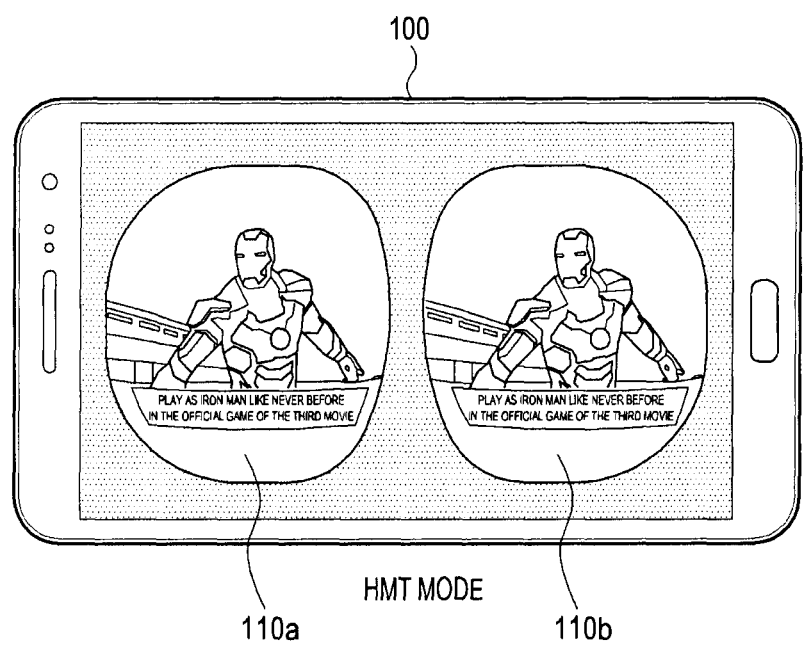

FIGS. 1A and 1B are diagrams illustrating various examples of the operation of a display in an electronic device according to various embodiments.

Referring to FIG. 1A, the electronic device 100 may include a display 110, and a first IR light-emitting device 121*a* and a second IR light-emitting device 121*b*, which are disposed to correspond to the left eye and the right eye of the user, respectively.

According to various embodiments, the electronic device 101 may be a wearable device (e.g., a face mounted type) to which a display device or an electronic device (e.g., a smartphone) including a display device can be mounted. For example, if it is detected that the user 101 is wearing the electronic device 100, or if a predetermined input is received, the electronic device 100 may operate in a head mounted display (HMD) mode. In addition, when the electronic device 100 is operably connected to various wearable devices, a screen of the HMD mode may be output through the display 110 of the electronic device 100.

The display 110 may include a first display region 120*a* and a second display region 120*b* corresponding to the left eye 101*a* and the right eye 101*b* of the user, respectively. For example, the display areas may be configured by physically separating the display panel or by dividing the screen into display areas corresponding to the respective eyes.

According to various embodiments, the display 110 may output a virtual reality (VR) screen in the HMD mode. For example, the screen of virtual reality may be output as a 3D image.

According to various embodiments, when at least two light-emitting devices (e.g., the first IR light-emitting device 121*a* and the second IR light-emitting device 121*b*) output optical signals (e.g., infrared rays), the electronic device 100 may determine gazes of the left eye 101*a* and the right eye 101*b* on the basis of the positions from which the optical signals are reflected in the left eye 101*a* and the right eye 101*b* of the user. For example, the electronic device 100 may determine the gaze position of the left eye 101*a* and the right eye 101*b*, and it may identify an object (e.g., 111) corresponding to the positions on the screen, thereby determining that the object 111 is selected by the user's gaze.

According to various embodiments, the light-emitting devices may be diodes that emit various types of optical signals (e.g., infrared rays or visible light), and may be configured to be disposed between the back surface of the display panel and the housing of the electronic device 100 so as to correspond to the first display region 120*a* and the second display region 120*b*, respectively.

Referring to FIG. 1B, when the display of the electronic device 100 operates in a normal mode, a single operation screen 110 may be displayed as shown in the upper diagram of FIG. 1B.

According to various embodiments, when the electronic device 100 is mounted to various wearable devices, or when a predetermined input is detected, the electronic device may operate in an HMT (head mounted theater) (or HMD) mode as shown in the lower diagram of FIG. 1B. For example, when the electronic device 100 operates in the HMT mode, a screen 110a corresponding to the left eye 101a of the user and a screen 110b corresponding to the right eye 101b of the user may be displayed separately. In the HMT mode screen, one image may be divided into two images 110a and 110b to then be displayed.

In various embodiments, when the electronic device 100 is mounted to a wearable device and operates in the HMT mode, display regions or display positions of the screens corresponding to the HMT mode (the screen 110a corresponding to the left eye and the screen 110b corresponding to the right eye) may be determined.

Figure 2:
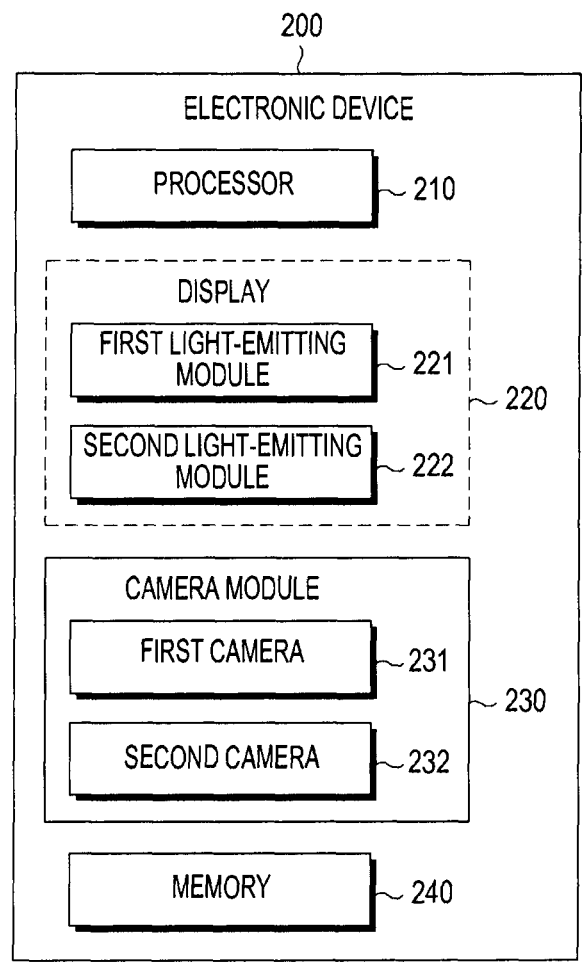
FIG. 2 is a block diagram illustrating an example of the configuration of an electronic device according to various embodiments.

FIG. 2 is a block diagram illustrating an example of the configuration of an electronic device according to various embodiments.

Referring to FIG. 2, the electronic device 200 may include a processor 210, a display 220, at least two light-emitting devices (e.g., a first light-emitting module 221 and a second light-emitting module 222), a camera module 230, and a memory 240.

The processor 210 may perform the overall operations of the electronic device 200 and may perform a control such that the light-emitting devices emit light on the basis of the screen frame output from the display 220.

According to various embodiments, the processor 210 may identify the position from which an optical signal (e.g., infrared ray) emitted from the light-emitting device is reflected in the user's cornea using the camera module 230, and may control an object displayed on the display 220 on the basis of the position.

The display 220 may include a display panel (not shown) including a plurality of light-emitting devices, and the first light-emitting module 221 or the second light-emitting module 222 may be disposed adjacent to the light-emitting devices positioned in parallel with the center of the user's eyes (e.g., left eye and right eye), among the plurality of light-emitting devices. For example, although the first light-emitting module 221 and the second light-emitting module 222 are provided in the display 220 in the drawing, the first light-emitting module 221 and the second light-emitting module 222 may be disposed in various positions (e.g., between the display 220 and the housing of the electronic device 200) as long as they can emit light in parallel with the center of the user's eyes when the user wears the electronic device 200.

The light-emitting devices may be light-emitting diodes (LED) or infrared (IR) LEDs, and they may include first and second light-emitting modules 221 and 222 including one or more light-emitting diodes.

The camera module 230 may include at least two lenses and image sensors corresponding to the left eye and right eye of the user, respectively. For example, a first camera 231 and a second camera 232 may be disposed at positions corresponding to the left eye and the right eye, respectively, in order to detect optical signals reflected from the user's eyes as image signals.

According to various embodiments, the image sensors of the camera module 230 may process reflection signals of the optical signals, which are formed on the lenses corresponding to the respective image sensors, into image signals. For example, the electronic device 200 may determine the position that the user gazes at on the basis of the reflection signals.

The memory 240 may store instructions configured to allow the processor 210 to: enable the at least two light-emitting devices to output optical signals; identify the positions from which the output signals are reflected in the user's eye by using the camera module 230; and determine a user's gaze.

An electronic device 200, according to various embodiments, may include: a housing configured to have a first surface facing a first direction and a second surface facing a second direction opposite to the first direction; a display (e.g., the display 220) configured to be positioned between the first surface and the second surface; a first light-emitting device (e.g., the first light-emitting module 221) and a second light-emitting device (e.g., the second light-emitting module 222) configured to be positioned between the second surface and the left-eye display region andright-eye display region of the display, respectively; and a first infrared camera and a second infrared camera configured to be positioned between the display and the second surface so as to correspond to the first light-emitting device and the second light-emitting device, respectively.

The electronic device 200, according to various embodiments, may further include a processor configured to be electrically connected to the display and a memory 240 configured to be electrically connected to the processor, wherein the memory may store instructions configured to allow, when executed, the processor to: detect a first infrared ray output from the first light-emitting device and reflected from the left eye of a user using the first infrared camera; detect a second infrared ray output from the second light-emitting device and reflected from the right eye of the user using the second infrared camera; and determine a user's gaze on the basis of the first infrared ray and the second infrared ray.

According to various embodiments, the instructions may be configured to allow
the processor to control the first light-emitting device and the second light-emitting device so as to output the first infrared ray and the second infrared ray between two adjacent image frames output through the display.

According to various embodiments, the first light-emitting device and the second light-emitting device may include at least two light-emitting devices.

According to various embodiments, the instructions may be configured to allow the processor to: identify at least two infrared rays emitted from the at least two light-emitting devices and reflected from the left eye and the right eye, respectively; and determine that an intermediate position between positions from which the at least two infrared rays are reflected is the position that the left eye and the right eye gaze at, respectively.

According to various embodiments, the first light-emitting device and the second light-emitting device may be disposed at the centers of the left-eye display region and the right-eye display region, respectively.

According to various embodiments, the first light-emitting device and the second light-emitting device may be infrared (IR) light-emitting diodes (LEDs), and may be disposed adjacent to at least some of the plurality of diodes constituting the display.

According to various embodiments, each of the first infrared camera and the second infrared camera may include a lens and an infrared sensor, and the instructions may be configured to allow the processor to detect an infrared ray incident on the lens using the infrared sensor, thereby determining the position that the user gazes at.

According to various embodiments, the first light-emitting device and the second light-emitting device may be disposed between the outer surface of the display and the second surface.

Figure 3:
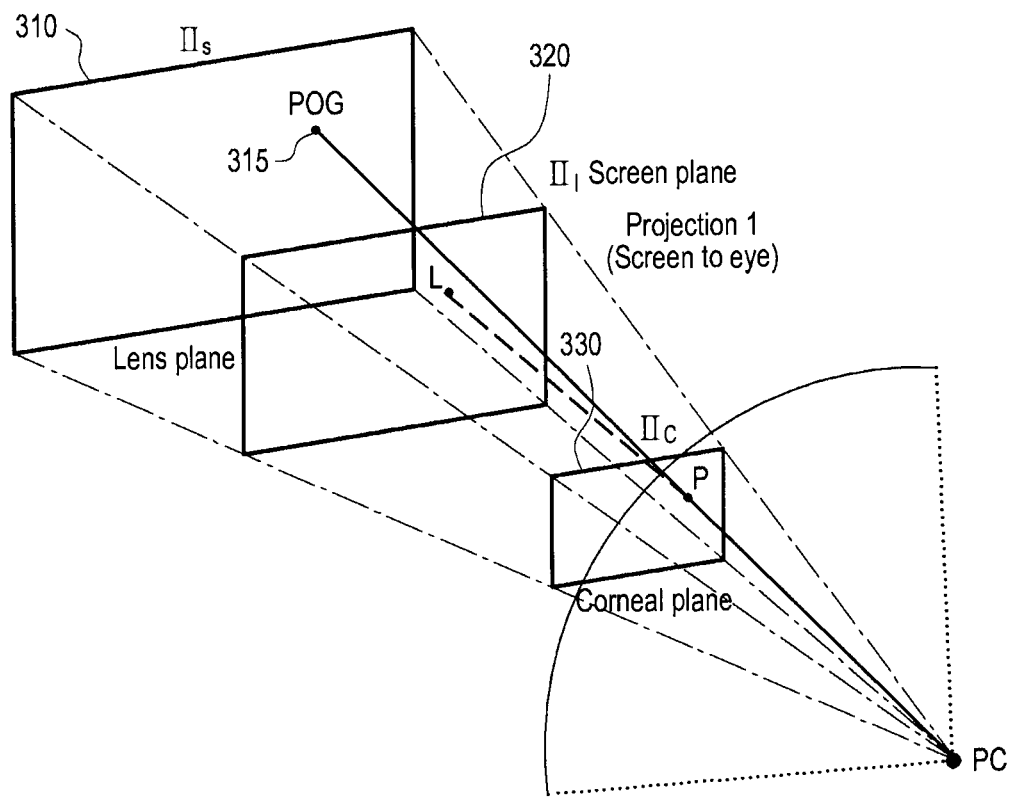
FIG. 3 is a diagram illustrating modeling of gaze tracking according to various embodiments.

FIG. 3 is a diagram illustrating the modeling of gaze tracking according to various embodiments.

According to various embodiments, the electronic device may identify the positions from which light is reflected in the user's eyes, thereby tracking a user's gaze.

According to various embodiments, a technique for estimating and tracking the point of gaze (hereinafter, referred to as "POG") 315 of the user on the screen can be applied to various embodiments. For example, in order to accurately track the user's gaze, the electronic device may use a visible camera, an IR camera, an IR LED lighting device, or the like. In this case, it is possible to use a pupil center corneal reflection (PCCR) technique that uses the coordinates of a pupil center (hereinafter, referred to as "PC") and the coordinates of a corneal reflection point (hereinafter, referred to as "P") where the optical signal emitted from the light-emitting device of the electronic device is reflected from the eye.

FIG. 3 shows a geometric model employed in the homography normalization (FIN) technique. The FIN model may include three planes. The three planes include a lens plane ($\Pi_S$) 310 of a camera, which is provided between the display panel and the image sensor and on which light reflected from the cornea is incident, a corneal plane ($\Pi_C$) 330 from which an optical signal emitted from the light-emitting device is reflected, and a screen plane ($\Pi_I$) 320 of the display panel.

According to various embodiments, the electronic device may allow the light-emitting device to output an optical signal incident on the cornea, and the point (P) on the plane ($\Pi_C$) 330 is formed on the lens plane (image plane) ($\Pi_S$) 310 through the camera, thereby obtaining an eye image. For example, the electronic device may track the POG 315 on the basis of a component of the optical signal or the position of the optical signal in the eye image.

Figure 4:
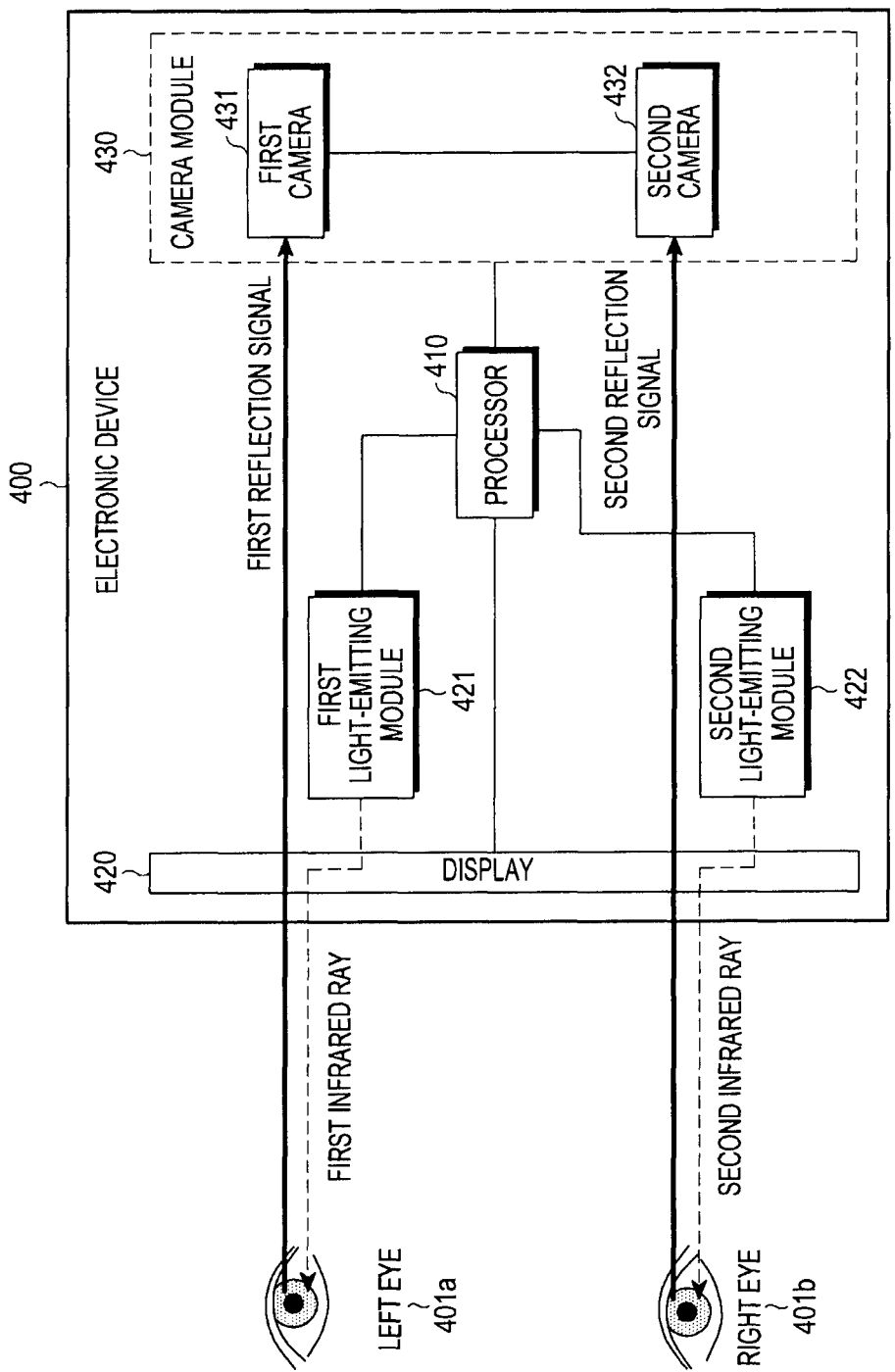
FIG. 4 is a block diagram illustrating an example of the configuration of an electronic device for tracking a gaze according to various embodiments.

FIG. 4 is a block diagram illustrating an example of the configuration of an electronic device for tracking a gaze according to various embodiments.

Referring to FIG. 4, an electronic device 400 may include a processor 410, a display 420, at least two light-emitting devices (e.g., a first light-emitting module 421 and a second light-emitting module 422), and a camera module 430.

The processor 410 may perform a control such that the first light-emitting module 421 and the second light-emitting module 422 output optical signals (e.g., a first infrared ray and a second infrared ray), and such that the camera module 430 identifies the output optical signals reflected from the user's eyes (a first reflection signal and a second reflection signal) as image signals, thereby tracking a user's gaze.

The display 420 may include a display panel (not shown) including a plurality of light-emitting devices, and the first light-emitting module 421 or the second light-emitting module 422 may be disposed adjacent to the light-emitting devices positioned in parallel with the center of the user's eyes (e.g., the left eye 401a and the right eye 401b), among the plurality of light-emitting devices. For example, the first light-emitting module 421 and the second light-emitting module 422 may be included in the display 420. In addition, the first light-emitting module 421 and the second light-emitting module 422 may be disposed in various positions in the electronic device 400 as long as they can emit light in parallel with the center of the user's eyes when the user wears the electronic device 400.

According to various embodiments, when the display 420 outputs a screen through the display panel, it is possible to perform a control such that the first light-emitting module 421 and the second light-emitting module 422 output optical signals (e.g., a first infrared ray and a second infrared ray) on the basis of a frame cycle of the screen. For example, when image frames are continuously output through the display panel, the first infrared ray and the second infrared ray may be output at points in time between the image frames.

The camera module 430 may include a first camera 431 and a second camera 432 corresponding to the left eye 401a and the right eye 401b of the user, respectively, and each camera may include one or more lenses and sensors (e.g., an image sensor or an infrared sensor). For example, the first camera 431 may create a left-eye image on the basis of an optical signal (e.g., a first reflection signal) output from the first light-emitting module 421 and reflected from the left eye 401a, and the second camera 432 may create a right-eye image on the basis of an optical signal (e.g., a second reflection signal) output from the second light-emitting module 422 and reflected from the right eye 401b.

According to various embodiments, the processor 410 may determine that the positions where the first reflection signal and the second reflection signal are detected in the left-eye image and the right-eye image obtained through the camera module 430 are the gaze of the left eye 401a and the gaze of the right eye 401b, respectively, and may determine that the central position between the gaze of the left eye 401a and the gaze of the right eye 401b is the position that the user gazes at.

Figure 5:
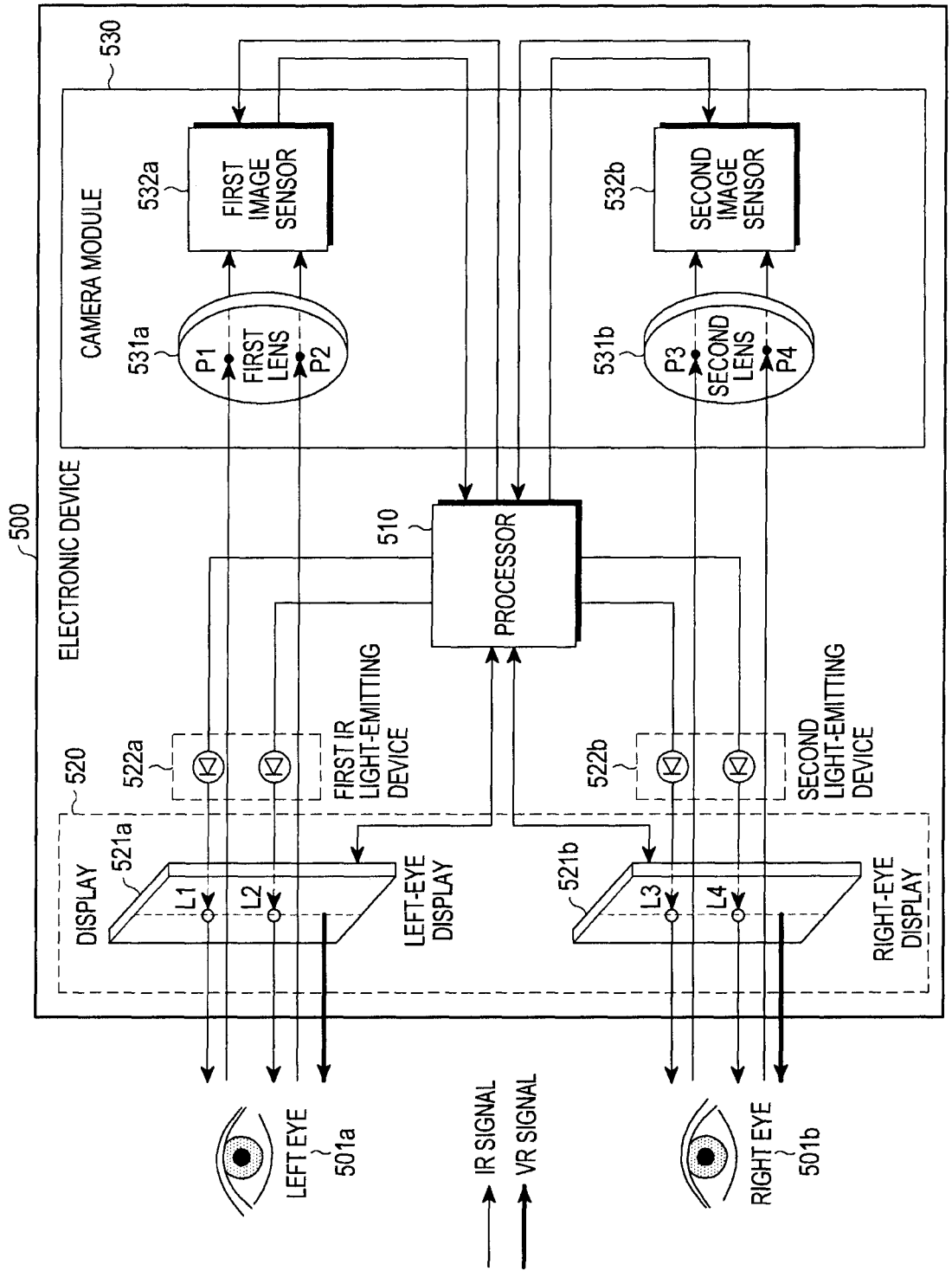
FIG. 5 is a block diagram illustrating an example of the configuration of an electronic device for tracking a gaze according to various embodiments.

FIG. 5 is a block diagram illustrating an example of the configuration of an electronic device for tracking a gaze according to various embodiments.

Referring to FIG. 5, an electronic device 500 may include a processor 510, a display 520, at least two light-emitting devices (e.g., a first IR light-emitting device 522a and a second IR light-emitting device 522b), and a camera module 530.

The processor 510 may perform control such that the first IR light-emitting module 522a and the second light-emitting module 522b output infrared rays (IR signals) as optical signals, and may identify points from which the output infrared rays are reflected in the user's eye through eye images generated by the camera module 530. For example, the processor 510 may determine gazes of a left eye 501a and a right eye 501b on the basis of the identified reflection points.

The display 520 may include a left-eye display 521a and a right-eye display 521b, and the respective displays may display screens corresponding to the left eye 501a and the right eye 501 when the user wears the electronic device 500. For example, although the left-eye display 521a and the right-eye display 521b are physically separated from each other to provide respective display panels in the drawing, a single display panel may be divided into display regions corresponding to the left eye 501a and the right eye 501b, respectively, thereby displaying the screens.

According to various embodiments, each of the first IR light-emitting device 522a and the second IR light-emitting device 522b may include two light-emitting devices. For example, as the first IR light-emitting device 522a and the second IR light-emitting device 522b emit light, two reflection points may be formed on each of the left eye 501a and the right eye 501b, and the processor 510 may determine that the intermediate position between the reflection points formed on each eye is the gaze of the eye.

According to various embodiments, two or more light-emitting devices for the left eye 501a may be configured to output optical signals at positions (e.g., L1 and L2) of the left-eye display 521a, which are spaced a predetermined distance apart from each other, and two or more light-emitting devices for the right eye 501b may be configured to output optical signals at positions (e.g., L3 and L4) of the right-eye display 521b, which are spaced to correspond to the spacing of the devices of the left-eye display 521a.

Although two light-emitting devices for outputting light to each eye are provided in the drawing according to various embodiments, three or more light-emitting devices may be employed. The electronic device 500 may identify the positions where the light emitted from the light-emitting devices is reflected from the user's eyes, and may determine the position that the user gazes at by using a figure generated by connecting the positions.

The camera module 530 processes optical signals reflected from the left eye 501a and the right eye 501b into image signals, and may include lenses (e.g., a first lens 531a and a second lens 531b) corresponding to the left eye 501a and the right eye 501b, respectively, and image sensors (e.g., a first image sensor 532a and a second image sensor 532b). For example, the image sensors may be infrared sensors capable of detecting infrared rays reflected from the left eye 501a and the right eye 501b.

According to various embodiments, the first image sensor 532a and the second image sensor 532b may have a structure in which a color filter is stacked on a photo diode, and an IR cut filter may be provided on the front surface of each sensor in order to receive only visible light signals. For example, in order to detect infrared rays output from the light-emitting devices and reflected from the left eye 501a and the right eye 501b, the respective image sensors may be configured such that the IR cut filter is not included. In this case, the electronic device 500 can obtain an image having higher sensitivity than that of the image obtained by receiving only the visible light signals, and the manufacturing process of the electronic device 500 can be simplified.

According to various embodiments, when optical signals reflected from the left eye 501a and the right eye 501b pass through the first lens 531a and the second lens 531b, the processor 510 may use the camera module 530 so as to identify the points (e.g., P1, P2, P3, and P4) through which the reflected optical signals pass on the respective lenses. For example, the processor 510 may identify that a point corresponding to an intermediate position between P1 and P2 in the image of the left eye 501a is the gaze of the left eye 501a and a position corresponding to an intermediate position between P3 and P4 in the image of the right eye 501b is the gaze of the right eye 501b.

Figure 6:
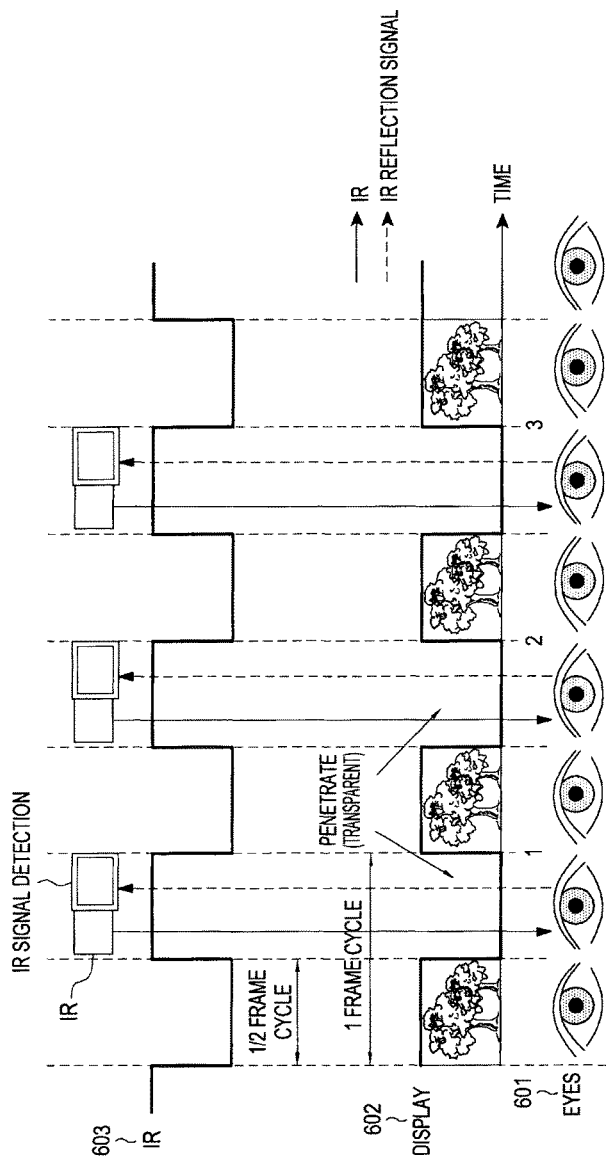
FIG. 6 is a timing diagram illustrating cycles of outputting screens and optical signals in an electronic device according to various embodiments.

FIG. 6 is a timing diagram illustrating cycles of outputting screens and optical signals in an electronic device according to various embodiments.

According to various embodiments, the electronic device may set the timing 603 for optical (IR) signal output from a light-emitting device (e.g., an IR LED) and detection thereof on the basis of the display timing 602 through the display.

According to various embodiments, when a gaze tracking operation is performed, the electronic device may set a period of outputting a screen frame within the frame cycle of each screen frame. For example, the electronic device may perform control such that an image signal of a screen frame is output during a half of one frame period and an optical signal is output during the remaining half frame period.

According to various embodiments, when a screen is output through the display, the electronic device may switch between an operation of outputting an image frame and an operation of emitting light by the light-emitting device in a predetermined frame cycle {e.g., 0.5 fps (frame per second)}, thereby alternately outputting the image frames and the optical signals through the display. For example, the electronic device may perform control such that an image signal is output through the display during the first half cycle of each frame (e.g., a period of 1/2 fps) and an optical signal is output through the display during the remaining half cycle of each frame (e.g., a period of 1/2 fps).

According to various embodiments, the electronic device may output a screen frame through the display during the first half period in each frame cycle according to the display timing 602, and may output an optical signal during the remaining half period in each frame cycle according to the optical signal output and detection timing 603, thereby detecting the output optical signal reflected from the user's eye 601. For example, the electronic device may perform control such that the optical signal passes through the display during a period in which the screen frame is not displayed.

Figure 7:
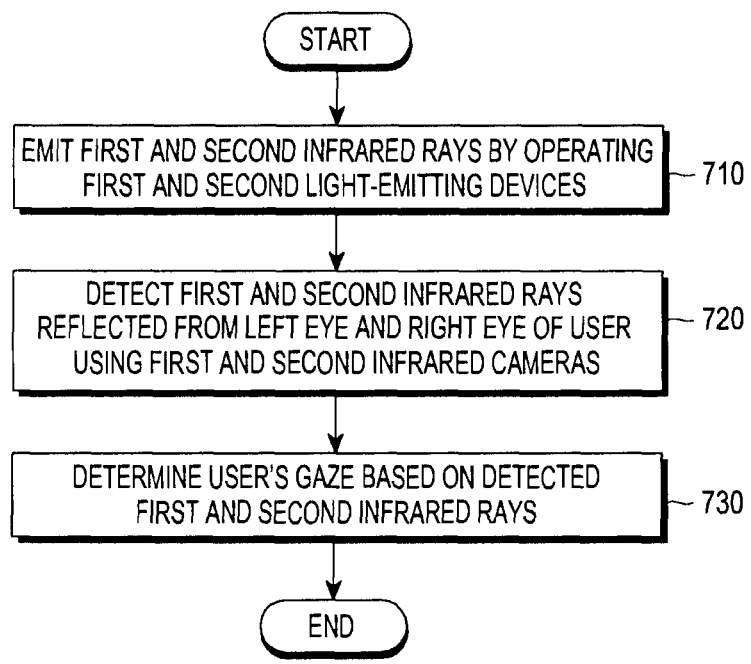
FIG. 7 is a flowchart illustrating an example of an operation of determining a user's gaze in an electronic device according to various embodiments.

FIG. 7 is a flowchart illustrating an example of an operation of determining a user's gaze in an electronic device according to various embodiments.

Referring to FIG. 7, the electronic device may operate a first light-emitting device and a second light-emitting device so as to emit a first infrared ray and a second infrared ray in operation 710.

The electronic device may include at least two infrared cameras, and, in operation 720, may detect the first infrared ray and the second infrared ray, which are reflected from the left eye and the right eye of the user, using the first infrared camera and the second infrared camera.

In operation 730, the electronic device may determine a user's gaze on the basis of the detected first and second infrared rays.

A gaze tracking method of an electronic device, according to various embodiments, may include: detecting optical signals output from a first light-emitting device and a second light-emitting device and reflected from the left eye and the right eye of a user using a first camera and a second camera corresponding to the first light-emitting device and the second light-emitting device, respectively; and determining a user's gaze on the basis of the detected optical signals, wherein the first light-emitting device and the second light-emitting device are positioned to correspond to a left-eye display region and a right-eye display region included in the display of the electronic device.

According to various embodiments, the gaze tracking method of an electronic device may further include controlling the first light-emitting device and the second light-emitting device so as to output the optical signals between two adjacent image frames output through a display.

According to various embodiments, each of the first light-emitting device and the second light-emitting device may include at least two light-emitting devices, and the gaze tracking method of an electronic device may further include: detecting at least two optical signals emitted from the at least two light-emitting devices and reflected from the left eye and the right eye, respectively; and determining that an intermediate position between the positions from which the at least two optical signals are reflected is the position that the left eye and the right eye gaze at, respectively.

According to various embodiments, each of the first light-emitting device and the second light-emitting device may be an infrared (IR) light-emitting diode (LED), and the first camera and the second camera may include infrared sensors. The gaze tracking method of an electronic device may further include detecting at least two infrared rays emitted from a first IR LED of the first light-emitting device and a second IR LED of the second light-emitting device and reflected from the left eye and the right eye, respectively, using the infrared sensors.

According to various embodiments, the gaze tracking method of an electronic device may further include determining that a central position between the at least two infrared rays detected by each of the first camera and the second camera is the position that the left eye and the right eye gaze at, respectively.

According to various embodiments, each of the first light-emitting device and the second light-emitting device is a light-emitting diode (LED), and the gaze tracking method of an electronic device may further include processing optical signals emitted from a first LED of the first light-emitting device and a second LED of the second light-emitting device and reflected from the left eye and the right eye, respectively, into image signals using the first camera and the second camera.

According to various embodiments, the gaze tracking method of an electronic device may further include: identifying an intermediate position, in the display, between a first image signal processed by the first camera and a second image signal processed by the second camera; and determining that the intermediate position is the position that the user gazes at.

Figure 8:
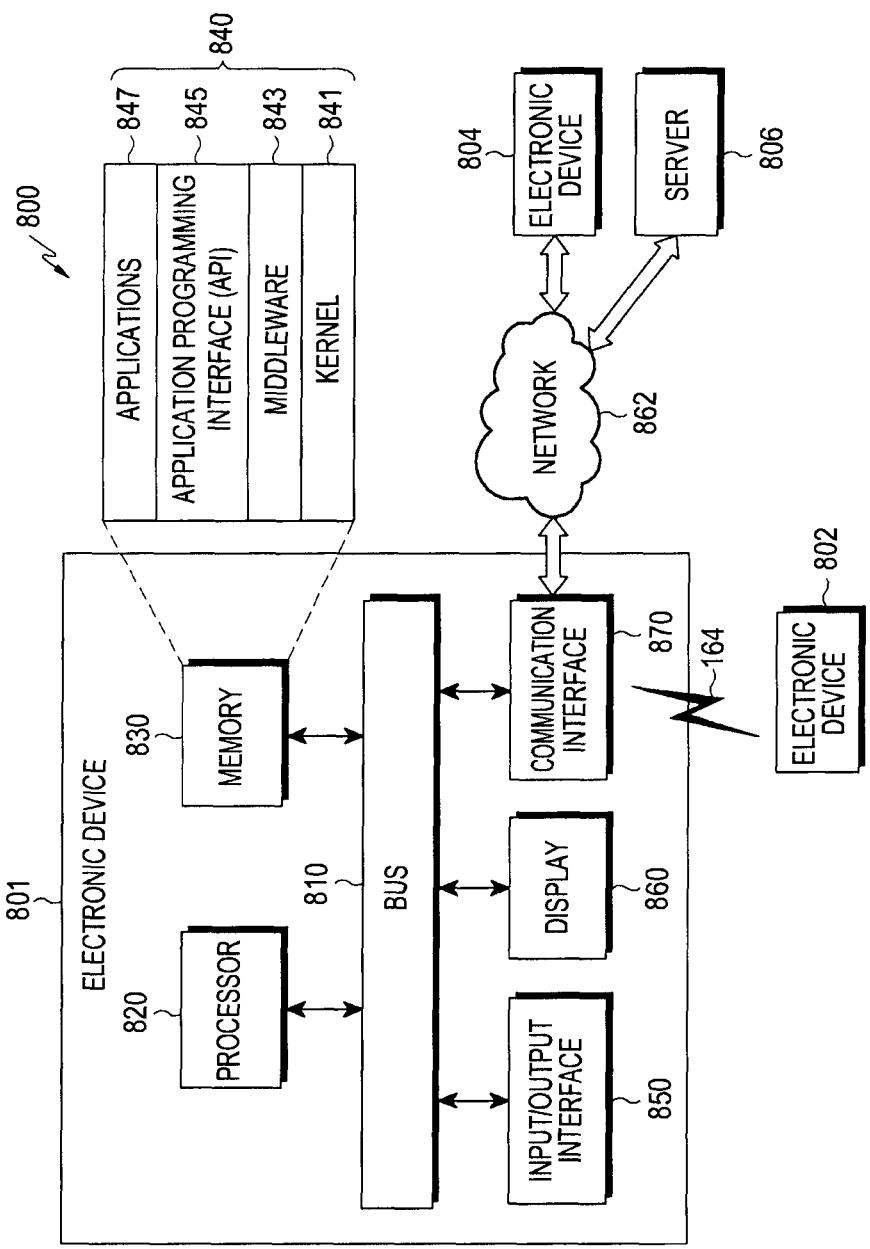
FIG. 8 is a diagram illustrating an example of a network environment according to various embodiments.

FIG. 8 is a diagram illustrating an example of a network environment according to various embodiments.

Referring to FIG. 8, an electronic device 801 in a network environment 800 is disclosed, and the electronic device 801 may include a bus 810, a processor 820, a memory 830, an input/output interface 850, a display 860, and a communication interface 870.

According to various embodiments, the electronic device 801 may exclude at least one of the above elements, or may further include other elements in addition thereto. The bus 810 may include a circuit for connecting the elements 810 to 870 with each other and transferring communication data (e.g., control messages or data) between the elements. The processor 820 may include at least one of a central processing unit, an application processor, or a communication processor (CP). The processor 820, for example, may perform a calculation or data processing in relation to control and/or communication of one or more other elements of the electronic device 801.

The memory 830 may include a volatile and/or non-volatile memory. For example, the memory 830 may store commands or data in relation to one or more other elements of the electronic device 801. According to an embodiment, the memory 830 may store software and/or programs 840. For example, the programs 840 may include a kernel 841, middleware 843, an application programming interface (API) 845, and/or application programs (or "applications") 847. At least some of the kernel 841, the middleware 843, or the API 845 may be referred to as an "operating system". The kernel 841, for example, may control or manage system resources (e.g., the bus 810, the processor 820, the memory 830, or the like), which are used to execute operations or functions that are implemented in other programs (e.g., the middleware 843, the API 845, or the application programs 847). In addition, the kernel 841 may provide an interface by which the middleware 843, the API 845, or the application programs 847 may access respective elements of the electronic device 801, thereby controlling or managing system resources.

The middleware 843, for example, may play the intermediate role between the API 845 or the application programs 847 and the kernel 841 to communicate with each other for transmission and reception of data. In addition, the middleware 843 may process one or more operation requests received from the application programs 847 according to priority. For example, the middleware 843 may give priority for using the system resources (e.g., the bus 810, the processor 820, the memory 830, or the like) of the electronic device 801 to at least one of the application programs 847, and may process one or more operation requests. The API 845 may be an interface by which the applications 847 control functions provided by the kernel 841 or the middleware 843, and, for example, may include one or more interfaces or functions (e.g., instructions) for file control, window control, image processing, text control, or the like. The input/output interface 850, for example, may transfer commands or data received from a user or other external devices to other elements of the electronic device 801, or may output commands or data received from the other elements of the electronic device 801 to the user or other external devices.

The display 860, for example, may include a liquid crystal display (LCD), a light-emitting diode (LED) display, an organic light-emitting diode (OLED) display, a micro-electromechanical systems (MEMS) display, or an electronic paper display. For example, the display 860 may display a variety of content (e.g., text, images, videos, icons, symbols, or the like) to the user. The display 860 may include a touch screen, and may receive, for example, a touch input, a gesture input, a proximity input, or a hovering input using electronic pens or a user's body part. The communication interface 870, for example, may establish communication between the electronic device 801 and external devices (e.g., a first external electronic device 802, a second external electronic device 804, or a server 806). For example, the communication interface 870 may be connected to the network 862 through wireless communication or wired communication, thereby communicating with external devices (e.g., the second external electronic device 804 or the server 806).

For example, the wireless communication may include cellular communication, which uses at least one of LTE, LTE-A (LTE Advance), CDMA (Code Division Multiple Access), WCDMA (Wideband CDMA), UMTS (Universal Mobile Telecommunications System), WiBro (Wireless Broadband), GSM (Global System for Mobile Communications), or the like. According to an embodiment, the wireless communication, for example, may include at least one of Wi-Fi (Wireless Fidelity), Bluetooth, BLE (Bluetooth Low-Energy), Zigbee, NFC (Near Field Communication), Magnetic Secure Transmission, Radio Frequency (RF), or a Body Area Network (BAN). According to an embodiment, the wireless communication may include GNSS. The GNSS, for example, may be a GPS (Global Positioning System), a GLONASS (Global Navigation Satellite System), a Beidou Navigation Satellite System (hereinafter, "Beidou"), Galileo, or an European Global Satellite-based Navigation System. Hereinafter, "GPS" may be used interchangeably with "GNSS" in the present specification. For example, the wired communication may include at least one of a USB (Universal Serial Bus), an HDMI (High-Definition Multimedia Interface), RS-232 (Recommended Standard 232), Power Line Communication, or a POTS (Plain Old Telephone Service). The network 862 may include at least one of the telecommunication networks, such as a computer network (e.g., LAN or WAN), the Internet, or a telephone network.

The first external device 802 and the second external device 804 may be the same as, or different from, the electronic device 801 as to the type thereof. According to various embodiments, at least some or all of the operations that are executed by the electronic device 801 may be executed by one or more other electronic devices (e.g., the electronic device 802 or 804, or the server 806). According to an embodiment, in the case where the electronic device 801 executes specific functions or services automatically or upon request, the electronic device 801 may make a request to the other devices (e.g., the electronic device 802 or 804, or the server 806) for at least some of the functions related to the same, instead of executing the functions or services by itself, or in addition thereto. The other electronic devices (e.g., the electronic device 802 or 804, or the server 806) may execute the requested functions or additional functions, and may transfer the results thereof to the electronic device 801. The electronic device 801 may provide the requested functions or services by providing the results without further processing or by additionally processing the same. To this end, for example, cloud computing, distributed computing, or client-server computing technology may be used.

Figure 9:
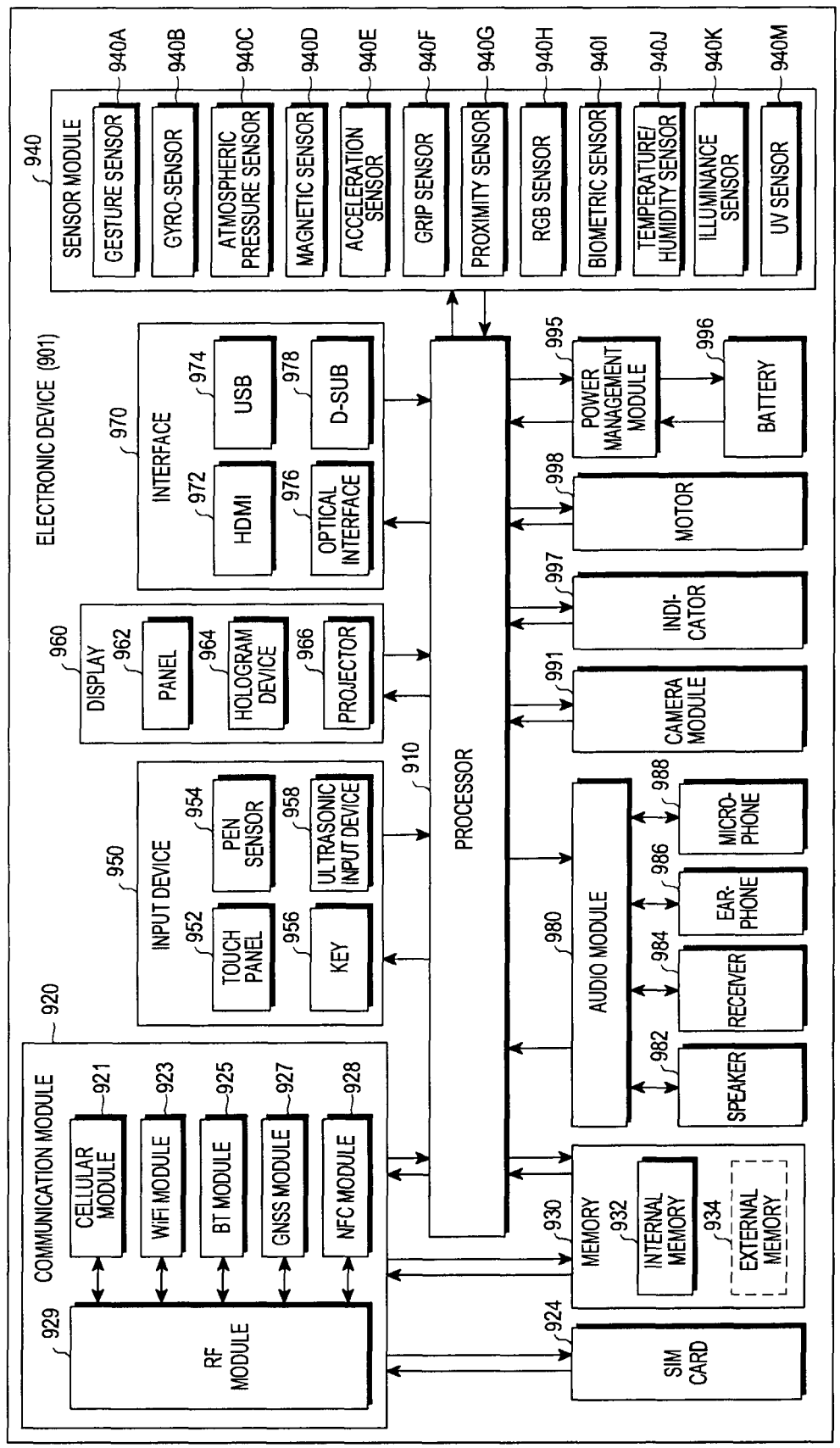
FIG. 9 is a block diagram illustrating an example of the configuration of an electronic device according to various embodiments.

FIG. 9 is a block diagram illustrating an example of configuration of an electronic device according to various embodiments.

According to various embodiments, the electronic device 901 may include all or some of the elements of the electronic device 801 shown in FIG. 8.

Referring to FIG. 9, the electronic device 901 may include one or more processors (e.g., AP) 910, a communication module 920, a subscriber identification module 924, a memory 930, a sensor module 940, an input device 950, a display 960, an interface 970, an audio module 980, a camera module 991, a power management module 995, a battery 996, an indicator 997, and a motor 998. The processor 910, for example, may control a multitude of hardware or software elements connected with the processor 910, and may perform processing of a variety of data and a calculation by executing an operating system or application programs. The processor 910 may be implemented by, for example, a system on chip (SoC). According to an embodiment, the processor 910 may further include a graphic processing unit (GPU) and/or an image signal processor. The processor 910 may include at least some (e.g., the cellular module 921) of the elements shown in FIG. 9. The processor 910 may load commands or data received from one or more other elements (e.g., a non-volatile memory) to a volatile memory to then process the same, and may store resultant data in a non-volatile memory.

The communication module 920 may have configuration the same as or similar to that of the communication interface 870. The communication module 920, for example, may include a cellular module 921, a Wi-Fi module 923, a Bluetooth module 925, a GNSS module 927, an NFC module 928, and an RF module 929. The cellular module 921, for example, may provide services of voice calls, video calls, text messaging, or the Internet through communication networks. According to an embodiment, the cellular module 921 may perform identification and verification of the electronic device 901 in communication networks using the subscriber identification module (e.g., a SIM card) 924.

According to an embodiment, the cellular module 921 may perform at least some of the functions provided by the processor 910. According to an embodiment, the cellular module 921 may include a communication processor (CP). According to some embodiments, at least some (e.g., two or more) of the cellular module 921, the Wi-Fi module 923, the Bluetooth module 925, the GNSS module 927, or the NFC module 928 may be included in a single integrated chip (IC) or IC package. The RF module 929, for example, may transmit and receive communication signals (e.g., RF signals). The RF module 929 may include, for example, a transceiver, a power amp module (PAM), a frequency filter, a low-noise amplifier (LNA), antennas, or the like. According to another embodiment, at least one of the cellular module 921, the Wi-Fi module 923, the Bluetooth module 925, the GNSS module 927, or the NFC module 928 may transmit and receive RF signals through a separate RF module. The subscriber identification module 924, for example, may include a card including a subscriber identification module or an embedded SIM, and may contain inherent identification information {e.g., an integrated circuit card identifier (ICCID)} or subscriber information {e.g., an international mobile subscriber identity (IMSI)}.

The memory 930 (e.g., the memory 830) may include an internal memory 932 or an external memory 934. The internal memory 932, for example, may include at least one of volatile memories (e.g., a DRAM, a SRAM, a SDRAM, or the like) or non-volatile memories {e.g., an one-time programmable ROM (OTPROM), a PROM, an EPROM, an EEPROM, a mask ROM, a flash ROM, a flash memory, a hard drive, a solid state drive (SSD), or the like}. The external memory 934 may include a flash drive, and may further include, for example, compact flash (CF), secure digital (SD), Micro-SD, Mini-SD, extreme digital (xD), a multi-media card (MMC), a memory stick, or the like. The external memory 934 may be functionally or physically connected with the electronic device 901 through various interfaces.

The sensor module 940, for example, may measure physical quantities or may detect the operation state of the electronic device 901, thereby converting the measured or detected information to electric signals. The sensor module 940 may include at least one of, for example, a gesture sensor 940A, a gyro-sensor 940B, an atmospheric pressure sensor 940C, a magnetic sensor 940D, an acceleration sensor 940E, a grip sensor 940F, a proximity sensor 940G, a color sensor 940H {e.g., a red-green-blue (RGB) sensor}, a biometric sensor 940I, a temperature/humidity sensor 940J, an illuminance sensor 940K, or an ultra-violet (UV) sensor 940M. Additionally or alternatively, the sensor module 940, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 940 may further include a control circuit for controlling one or more sensors included therein. In some embodiments, the electronic device 901 may further include a processor as a part of the processor 910 or separately from the processor 910, which is configured to control the sensor module 940, thereby controlling the sensor module 940 while the processor 910 is in a sleep mode.

The input device 950, for example, may include a touch panel 952, a (digital) pen sensor 954, keys 956, or an ultrasonic input device 958. The touch panel 952 may use at least one of, for example, a capacitive type, a pressure-sensitive type, an infrared type, or an ultrasonic type. In addition, the touch panel 952 may further include a control circuit. The touch panel 952 may further include a tactile layer, thereby providing a user with a tactile reaction. For example, the (digital) pen sensor 954 may be a part of the touch panel, or may include a separate recognition sheet. The keys 956 may include, for example, physical buttons, optical keys, or a keypad. The ultrasonic input device 958 may detect ultrasonic waves that are generated in input equipment through a microphone (e.g., a microphone 988), thereby identifying data corresponding to the detected ultrasonic waves.

The display 960 (e.g., the display 860) may include a panel 962, a hologram device 964, a projector 966, and/or a control circuit for controlling the same. The panel 962 may be implemented to be, for example, flexible, transparent, or wearable. The panel 962 may be configured with the touch panel 952 as one or more or more modules. According to an embodiment, the panel 962 may include a pressure sensor (or force sensor) capable of measuring the strength of pressure of a user's touch. The pressure sensor may be implemented to be integral with the touch panel 952, or may be implemented as one or more sensors separately from the touch panel 952. The hologram device 964 may display 3D images in the air using light interference. The projector 966 may display images by projecting light onto a screen. The screen may be positioned, for example, inside or outside the electronic device 901. The interface 970 may include, for example, an HDMI 972, a USB 974, an optical interface 976, or a D-subminiature (D-sub) interface 978. The interface 970 may be included in, for example, the communication interface 870 shown in FIG. 8. Additionally or alternatively, the interface 970 may include, for example, a mobile high-definition link (MHL) interface, an SD card/multi-media card (MMC) interface, or an infrared data association (IrDA) standard interface.

The audio module 980, for example, may convert a sound into an electric signal, and vice versa. At least some components of the audio module 980 may be included, for example, in the input/output interface 850 shown in FIG. 8. For example, the audio module 980 may process voice information that is input or output through a speaker 982, a receiver 984, earphones 986, or a microphone 988. The camera module 991, for example, may be a device for photographing still and moving images, and, according to an embodiment, the camera module 991 may include one or more image sensors (e.g., a front sensor or a rear sensor), lenses, an image signal processor (ISP), or a flash (e.g., an LED or a xenon lamp). The power management module 995, for example, may manage the power of the electronic device 901. According to an embodiment, the power management module 995 may include a power management integrated circuit (PMIC), a charger IC, or a battery or fuel gauge. The PMIC may be implemented by a wired charging type and/or a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be further included. The battery gauge may measure, for example, the remaining power of the battery 996, a charging voltage, current, or temperature. The battery 996 may include, for example, a rechargeable battery and/or a solar battery.

The indicator 997 may display a specific state (e.g., a booting state, a message state, or a charging state) of the whole or a part (e.g., the processor 910) of the electronic device 901. The motor 998 may convert an electric signal to a mechanical vibration, and may provide a vibration or a haptic effect. The electronic device 901 may include a device (e.g., a GPU) for supporting mobile TV, which can process media data according to standards, such as, for example, digital multimedia broadcasting (DMB), digital video broadcasting (DVB), or mediaFlo™. The respective elements described in the present disclosure may be configured using one or more components, and the names of the elements may vary with the type of electronic device. According to various embodiments, the electronic device (e.g., the electronic device 901) may exclude some elements thereof, or may further include other elements, or some of the elements may be combined as a single entity that performs the same function of the corresponding elements.

Figure 10:
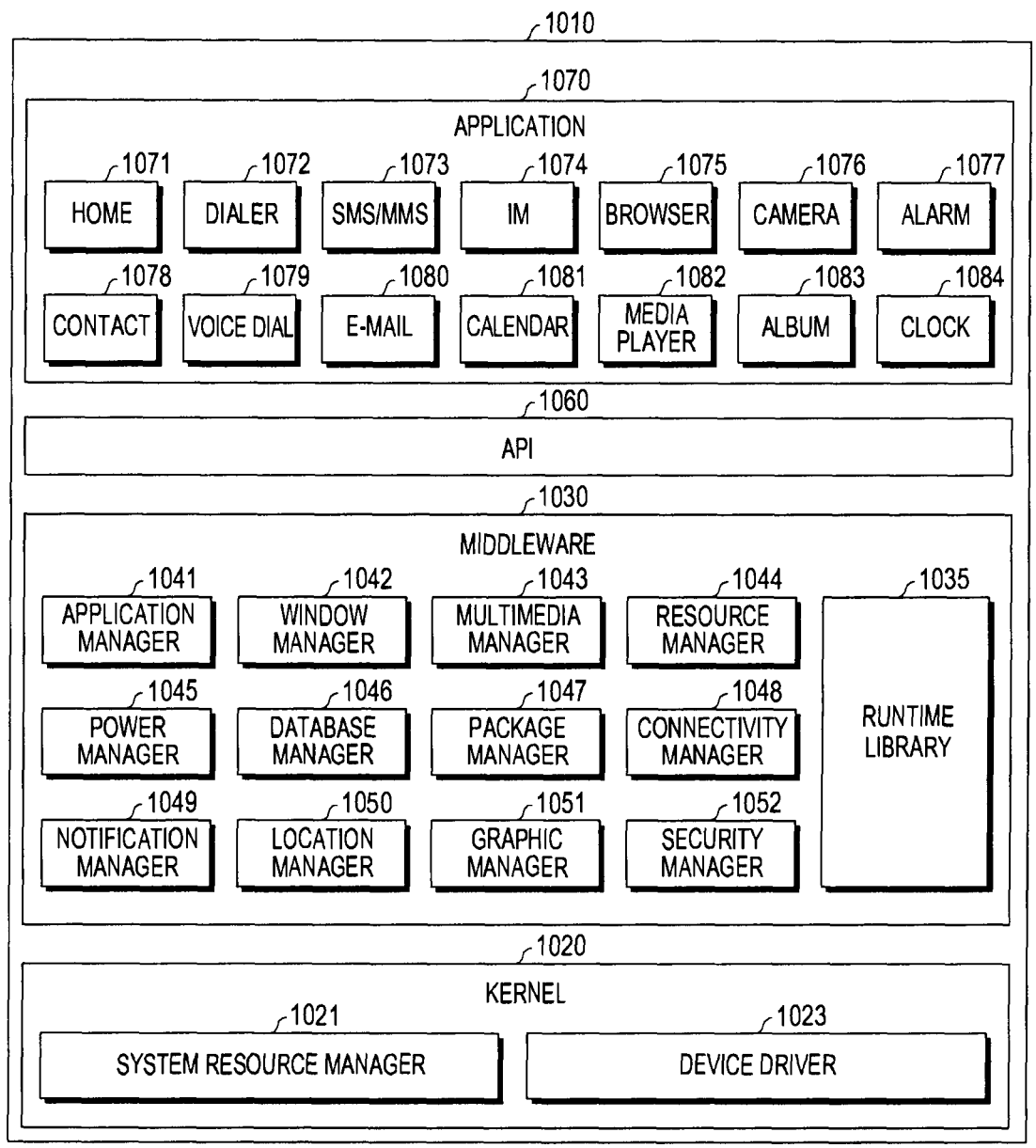
FIG. 10 is a block diagram illustrating an example of the configuration of a program module according to various embodiments.

FIG. 10 is a block diagram illustrating an example of configuration of a program module according to various embodiments.

According to various embodiments, a program module 1010 (e.g., the programs 840) may include an operating system for controlling resources related to the electronic device (e.g., the electronic device 801) and/or various applications (e.g., the application programs 847) that are driven under the operating system. For example, the operating system may be Android™, iOS™, Windows™, Symbian™, Tizen™, Bada™, or the like.

Referring to FIG. 10, the program module 1010 may include a kernel 1020 (e.g., the kernel 841), middleware 1030 (e.g., the middleware 843), an API 1060 (e.g., the API 845), and/or applications 1070 (e.g., the applications 847). At least some of the program module 1010 may be preloaded in the electronic device, or may be downloaded from external electronic devices (e.g., the electronic devices 802 and 804 or the server 806).

The kernel 1020, for example, may include a system resource manager 1021 and/or a device driver 1023. The system resource manager 1021 may perform control, allocation, or collection of the system resources. According to an embodiment, the system resource manager 1021 may include a process management unit, a memory management unit, or a file system management unit. The device driver 1023 may include, for example, a display driver, a camera driver, a Bluetooth driver, a shared memory driver, a USB driver, a keypad driver, a Wi-Fi driver, an audio driver, or an inter-process communication (IPC) driver. The middleware 1030, for example, may provide functions required in common for the applications 1070, or may provide the applications 1070 with various functions through the API 1060 in order to allow the applications 1070 to effectively use the limited system resources in the electronic device. According to an embodiment, the middleware 1030 may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, or a security manager 1052.

The runtime library 1035, for example, may include a library module that a compiler uses in order to add new functions through programming languages while the applications 1070 are executed. The runtime library 1035 may perform the input/output management, the memory management, or a function of an arithmetic calculation. The application manager 1041, for example, may manage a life cycles of the applications 1070. The window manager 1042 may manage a GUI resource used in the screen. The multimedia manager 1043 may identify formats for reproducing various media files, and may perform encoding or decoding of media files using a codec corresponding to each format. The resource manager 1044 may manage source codes of the applications 1070 or a storage space of a memory. The power manager 1045, for example, may manage battery capacity or power, and may provide power information necessary for the operation of the electronic device. According to an embodiment, the power manager 1045 may be associated with a basic input/output system (BIOS). The database manager 1046 may create, retrieve, or change a database that is to be used in the applications 1070. The package manager 1047 may manage the installation or update of the applications that are distributed in the form of a package file.

The connectivity manager 1048, for example, may manage a wireless connection. The notification manager 1049 may provide a user with events, such as received messages, appointments, or proximity notifications. The location manager 1050 may manage location information of the electronic device. The graphic manager 1051 may manage graphic effects to be provided to the user or user interfaces related thereto. The security manager 1052 may provide, for example, system security or user authentication. According to an embodiment, the middleware 1030 may include a telephony manager for managing the functions of a voice call or a video call of the electronic device, or may include a middleware module capable of configuring a combination of the functions of the above-described elements. According to an embodiment, the middleware 1030 may provide a module that is specialized according to the type of operating system. The middleware 1030 may dynamically exclude some of the existing elements or add new elements. The API 1060, for example, may be a set of API programming functions, and may be provided as a different configuration depending on an operating system. For example, one set of APIs may be provided to each platform in the case of Android or iOS, and two or more sets of APIs may be provided to each platform in the case of Tizen.

The applications 1070 may include applications of home 1071, a dialer 1072, SMS/MMS 1073, instant messages (IM) 1074, a browser 1075, a camera 1076, an alarm 1077, contacts 1078, a voice dialer 1079, e-mail 1080, a calendar 1081, a media player 1082, an album 1083, a watch 1084, healthcare (e.g., measuring the amount of exercise or blood glucose), and providing environment information (e.g., atmospheric pressure, humidity, or temperature information). According to an embodiment, the applications 1070 may include an information-exchange application that supports the exchange of information between the electronic device and the external electronic device. The information-exchange application, for example, may include a notification relay application for relaying specific information to the external electronic devices, or may include a device management application for managing the external electronic devices. For example, the notification relay application may transfer notification information generated in other applications of the electronic device to the external electronic devices, or may receive notification information from the external electronic device to then provide the same to the user. The device management application, for example, may install, delete, or update functions {e.g., turning on and off the external electronic device (or some elements thereof) or adjusting the brightness (or resolution) of a display} of the external electronic device that communicates with the electronic device or applications executed in the external electronic device. According to an embodiment, the applications 1070 may include applications that are designated according to the attributes (e.g., the healthcare application of a mobile medical device) of the external electronic device. According to an embodiment, the applications 1070 may include applications that are received from the external electronic device. At least some of the program module 1010, for example, may be implemented (e.g., executed) by software, firmware, hardware (e.g., the processor 910), or a combination thereof, and may include modules, programs, routines, sets of instructions, or processors for executing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 830) in the form of a program module. The instruction, when executed by a processor (e.g., the processor 820), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

What is claimed is:

1. An electronic device comprising:
    a housing, wherein a surface of the housing faces a first direction;
    a display facing a second direction opposite to the first direction and including a display panel;
    a first light-emitting device and a second light-emitting device positioned between the surface and a left-eye display region of the display and a right-eye display region of the display, respectively; and
    a first infrared camera and a second infrared camera positioned between the display and the surface so as to correspond to the first light-emitting device and the second light-emitting device, respectively,
    wherein the first light-emitting device is configured to output a first infrared ray toward the second direction, and the output first infrared ray passes through the display and is reflected by a left eye of a user,
    wherein the second light-emitting device is configured to output a second infrared ray toward the second direction, and the output second infrared ray passes through the display and is reflected by a right eye of the user, wherein based on the output first infrared ray being reflected by the left eye, a third infrared ray from the left eye passes through the display toward the first infrared camera, and wherein based on the output second infrared ray being reflected by the right eye, a fourth infrared ray from the right eye passes through the display toward the second infrared camera.

2. The electronic device of claim 1, further comprising
a processor configured to be electrically connected to the display; and
a memory configured to be electrically connected to the processor,
wherein the memory stores instructions configured to cause, when executed, the processor to:
detect the third infrared ray from the left eye, using the first infrared camera;
detect the fourth infrared ray reflected from the right eye, using the second infrared camera; and
determine a user's gaze based on the basis of the detected third infrared ray and the detected fourth infrared ray.

3. The electronic device of claim 2, wherein the instructions are configured to cause the processor to control the first light-emitting device and the second light-emitting device so as to output the first infrared ray and the second infrared ray between two adjacent image frames output through the display.

4. The electronic device of claim 2, wherein each of the first light-emitting device and the second light-emitting device comprises at least two light-emitting devices, and
wherein the instructions cause the processor to:
control the at least two light-emitting devices to output at least two first infrared rays;
based on the output at least two first infrared rays being reflected by the left eye and the right eye, identify at least two second infrared rays from the left eye and the right eye, respectively; and
determine that an intermediate position between points where the at least two second infrared rays are identified is a position at which the left eye and the right eye gaze, respectively.

5. The electronic device of claim 2, wherein the first light-emitting device and the second light-emitting device are infrared (IR) light-emitting diodes (LEDs) and are disposed adjacent to at least some of a plurality of diodes constituting the display, and
wherein the first light-emitting device is disposed at a center of the left-eye display region and the second light-emitting device is disposed at a center of the right-eye display region.

6. The electronic device of claim 2, wherein each of the first infrared camera and the second infrared camera comprises a lens and an infrared sensor, and
wherein the instructions are configured to cause the processor to detect an infrared ray incident on the lens using the infrared sensor, thereby determining a position at which the user gazes.

7. The electronic device of claim 2, wherein the first light-emitting device and the second light-emitting device are configured to be disposed between an outer surface of the display facing the second direction and the surface.

8. An electronic device comprising:
a housing, wherein a surface of the housing faces a first direction;
a display facing a second direction opposite to the first direction and including a display panel;
a first light-emitting device and a second light-emitting device positioned between the surface and a left-eye display region of the display and a right-eye display region of the display, respectively;
a first camera and a second camera positioned between the display and the surface housing so as to correspond to the first light-emitting device and the second light-emitting device, respectively;
a processor configured to electrically connected to the display; and
a memory configured to be electrically connected to the processor, wherein the memory stores instructions configured to cause, when executed, the processor to:
control the first light-emitting device to output a first infrared ray and control the second light-emitting device to output a second infrared ray, wherein the output first infrared ray is reflected by a left eye of a user and the output second infrared ray is reflected by a right eye of the user;
based on the output first infrared ray being reflected by the left eye, detect a first optical signal from the left eye, using the first camera;
based on the output second infrared ray being reflected by the right eye, detect a second optical signal from the right eye, using the second camera; and
determine a user's gaze based on the first optical signal and the second optical signal,
wherein the output first infrared ray and the output second infrared ray pass through the display toward the second direction,
wherein the first optical signal from the left eye passes through the display toward the first camera, and
wherein the second optical signal from the right eye passes through the display toward the second camera.

9. The electronic device of claim 8, wherein the first light-emitting device and the second light-emitting device are light-emitting diodes (LEDs), and
wherein the first light-emitting device and the second light-emitting device are disposed at a center of the left-eye display region and a center of the right-eye display region, respectively.

10. The electronic device of claim 8, wherein each of the first camera and the second camera comprises a lens and an image sensor, and
wherein the instructions are configured to cause the processor to detect an image signal of an optical signal incident on the lens through the image sensor, thereby determining a position at which the user gazes.

11. A gaze tracking method of an electronic device, the method comprising:
controlling a first light-emitting device of the electronic device to output a first infrared ray and controlling a second light-emitting device of the electronic device to output a second infrared ray, wherein the output first infrared ray is reflected by a left eye of a user and the output second infrared ray is reflected by a right eye of the user;
based on the output first infrared ray being reflected by the left eye, detecting a first optical signal from the left eye, using a first camera of the electronic device corresponding to the first light-emitting device;
based on the output second infrared ray being reflected by the right eye, detecting a second optical signal from the right eye, using a second camera of the electronic device corresponding to the second light-emitting device; and determining a user's gaze based on the detected first optical signal and the detected second optical signals, wherein the first light-emitting device and the second light-emitting device are positioned between a surface of the housing facing a first direction and a left-eye display region of the display and a right-eye display region of a display of the electronic device, respectively, wherein the first camera and the second camera are positioned between the display and the surface so as to correspond to the first light-emitting device and the second light-emitting device, respectively, wherein the output first infrared ray and the output second infrared ray pass through the display toward a second direction opposite to the first direction, wherein the first optical signal from the left eye passes through the display toward the first camera, and wherein the second optical signal from the right eye passes through the display toward the second camera.

12. The method of claim 11, further comprising controlling the first light-emitting device and the second light-emitting device so as to output the first infrared ray and the second infrared ray between two adjacent image frames output through the display.

13. The method of claim 11, wherein each of the first light-emitting device and the second light-emitting device comprises at least two light-emitting devices, and
    wherein the method further comprises:
        controlling the at least two light-emitting devices to output at least two infrared rays;
        based on output at least two infrared rays being reflected by the left eye or the right eye, detecting at least two optical signals from the left eye and the right eye, respectively; and
        determining that an intermediate position between positions from which the at least two optical signals are detected is a position at which the left eye and the right eye gaze, respectively.

14. The method of claim 11, wherein the first light-emitting device and the second light-emitting device are infrared (IR) light-emitting diodes (LEDs),
    wherein the first light-emitting device is disposed at a center of the left-eye display region and the second light-emitting device is disposed at a center of the right-eye display region,
    wherein each of the first camera and the second camera comprise infrared sensors, and
    wherein the method further comprises:
        control a first IR LED of the first light-emitting device and a second IR LED of the second light-emitting device to output at least two first infrared rays;
        based on the output at least two first infrared rays being reflected by the left eye or the right eye, detecting at least two second infrared rays from the left eye and the right eye, respectively, using the infrared sensors; and
        determining that a central position between the at least two second infrared rays detected by each of the first camera and the second camera is a position at which the left eye and the right eye gaze, respectively.

15. The method of claim 11, wherein each of the first light-emitting device and the second light-emitting device is a light-emitting diode (LED), and
    wherein the method further comprises:
        processing optical signals from the left eye and the right eye, respectively, into image signals using the first camera and the second camera;
        identifying an intermediate position, in the display, between a first image signal processed by the first camera and a second image signal processed by the second camera; and
        determining that the intermediate position is a position at which the user gazes.

* * * * *